United States Patent
Zheng et al.

(10) Patent No.: US 9,035,231 B2
(45) Date of Patent: May 19, 2015

(54) SYSTEM AND METHOD FOR MONITORING LOAD-RELATED PARAMETERS OF A WIND TURBINE ROTOR BLADE

(75) Inventors: Danian Zheng, Simpsonville, SC (US); Hua Xia, Altamont, NY (US); Thomas Ernst Dinjus, Greer, SC (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 13/593,937

(22) Filed: Aug. 24, 2012

(65) Prior Publication Data

US 2014/0054476 A1 Feb. 27, 2014

(51) Int. Cl.
*G01J 1/04* (2006.01)
*G01J 1/42* (2006.01)
*G01J 5/08* (2006.01)
*F03D 11/00* (2006.01)

(52) U.S. Cl.
CPC ....... *F03D 11/0091* (2013.01); *F05B 2270/804* (2013.01); *Y02E 10/722* (2013.01)

(58) Field of Classification Search
USPC ............... 250/214.1, 208.2, 227.11; 700/286, 700/287; 416/1, 37, 11, 24, 132 B
See application file for complete search history.

(56) References Cited

U.S. PATENT DOCUMENTS 8,249,754 B2 * 8/2012 Hayashi et al. ................ 700/287
2010/0253569 A1 * 10/2010 Stiesdal ......................... 342/118

FOREIGN PATENT DOCUMENTS

| DK | EP 2589943 A1 * | 6/2013 | ................ G01L 3/10 |
| WO | WO 2010054661 A2 * | 5/2010 | ............. F03D 11/00 |

OTHER PUBLICATIONS

Article—Direct approach to determine static and dynamic behaviour of wind turbine blades for health monitoring and pitch control purposes, EWEA, 2011.

* cited by examiner

*Primary Examiner* — Francis M Legasse, Jr.
(74) *Attorney, Agent, or Firm* — Dority & Manning, P.A.

(57) ABSTRACT

In one aspect, a system for monitoring load-related parameters of a rotor blade of a wind turbine is disclosed. The system may generally include a plurality of reflective targets positioned within the rotor blade. Each reflective target may include a unique visual identifier. In addition, the system may include a light source configured to illuminate the reflective targets and a sensor configured to detect light reflected from the reflective targets.

17 Claims, 7 Drawing Sheets

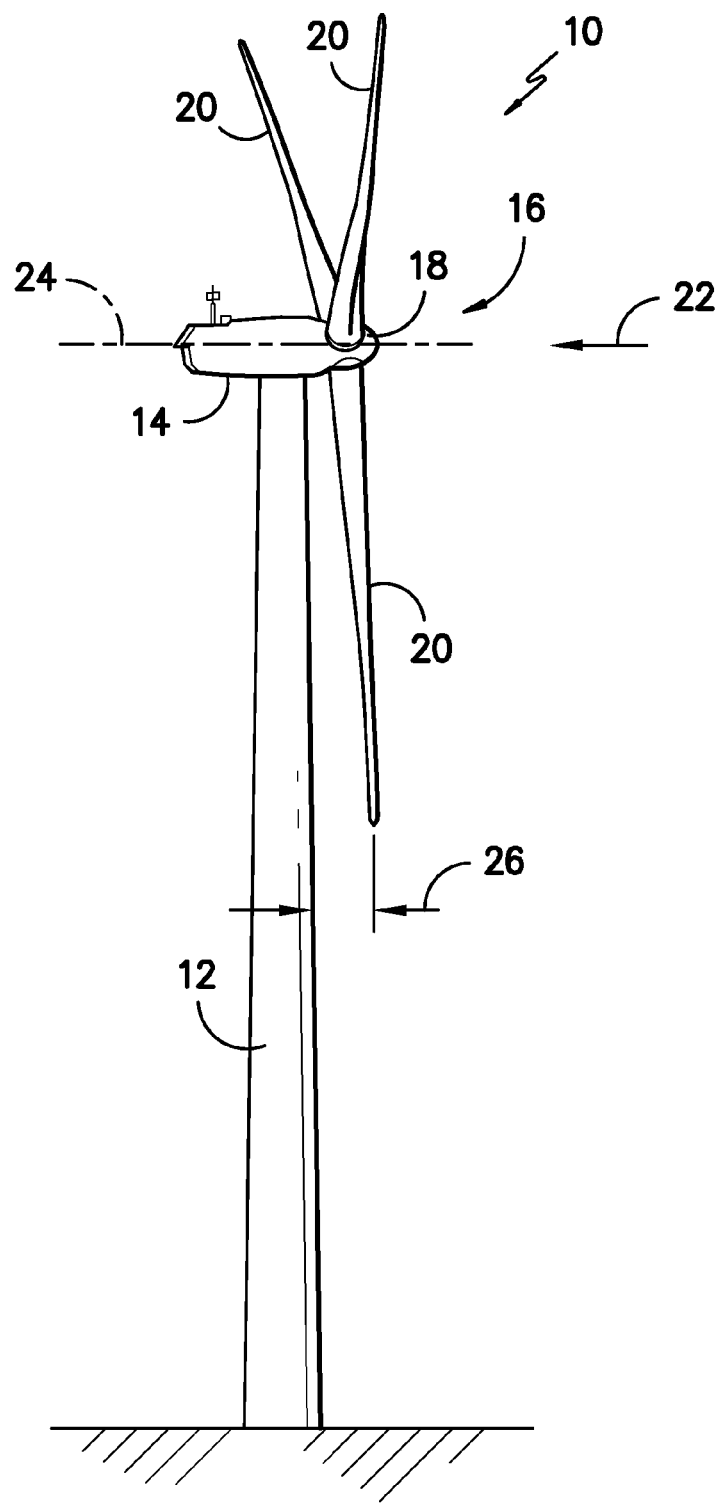
FIG. −1−

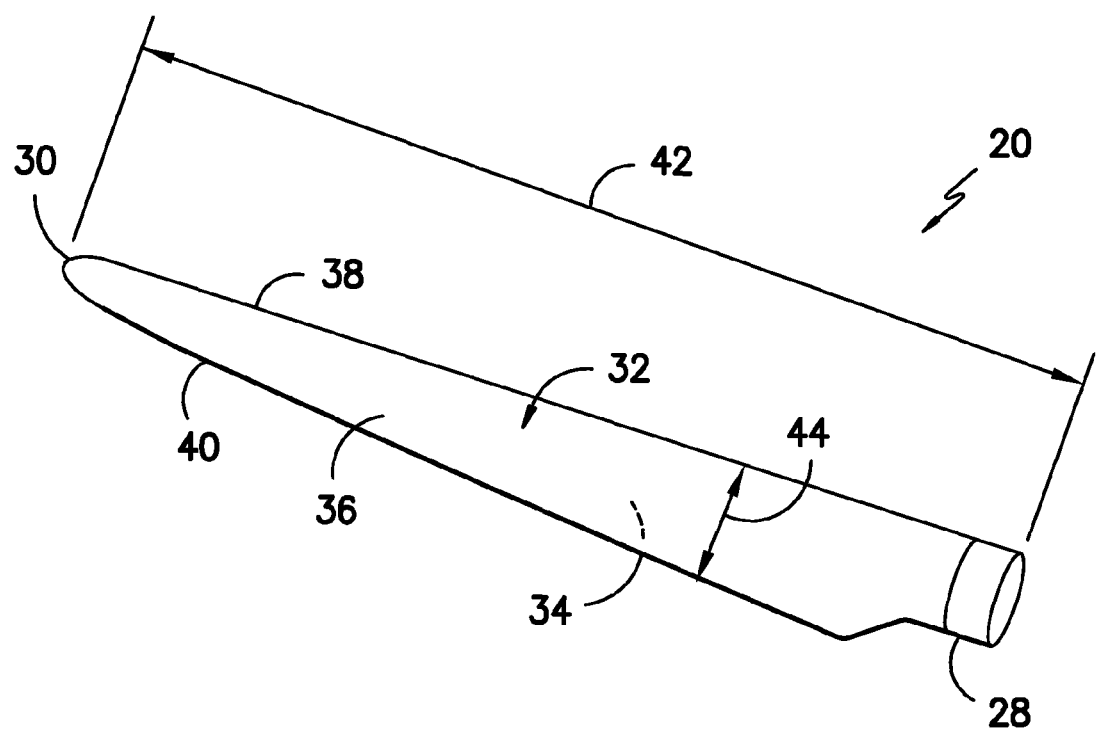
FIG. -2-

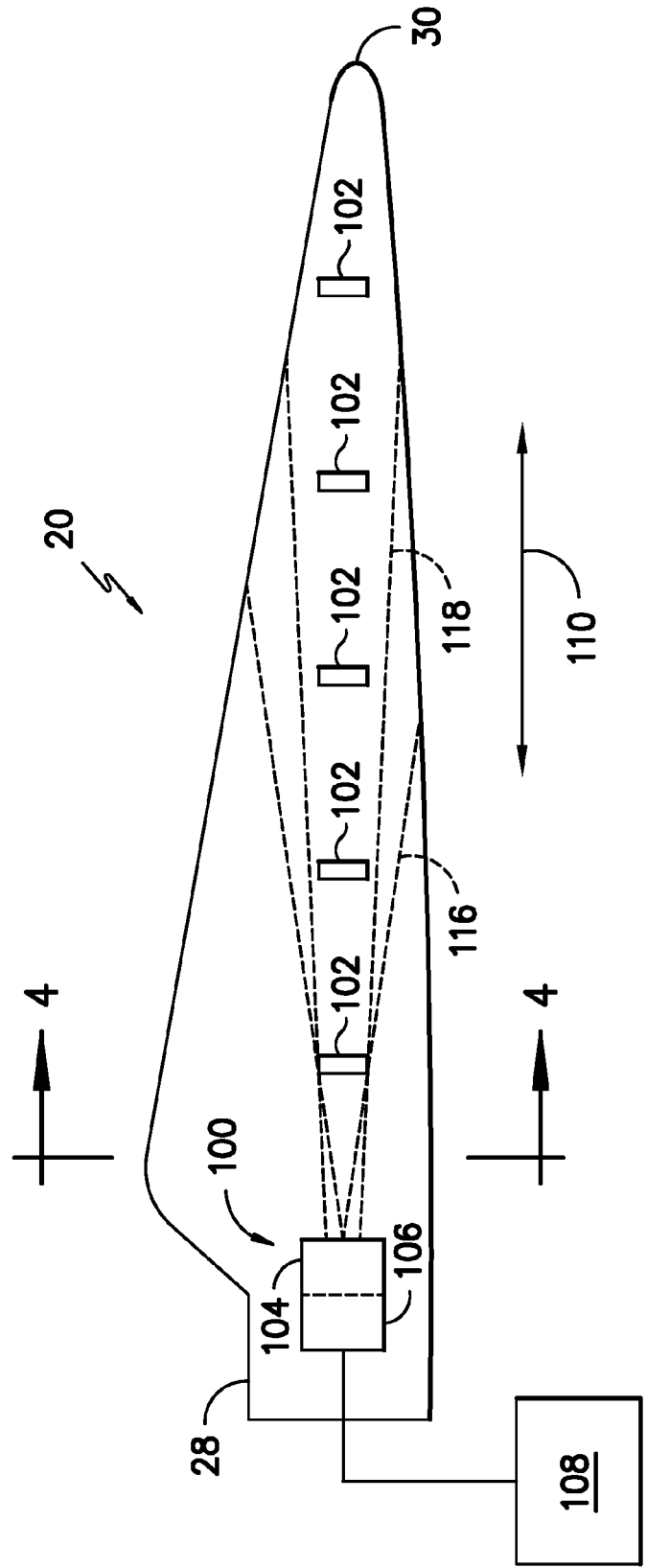
FIG. -3-

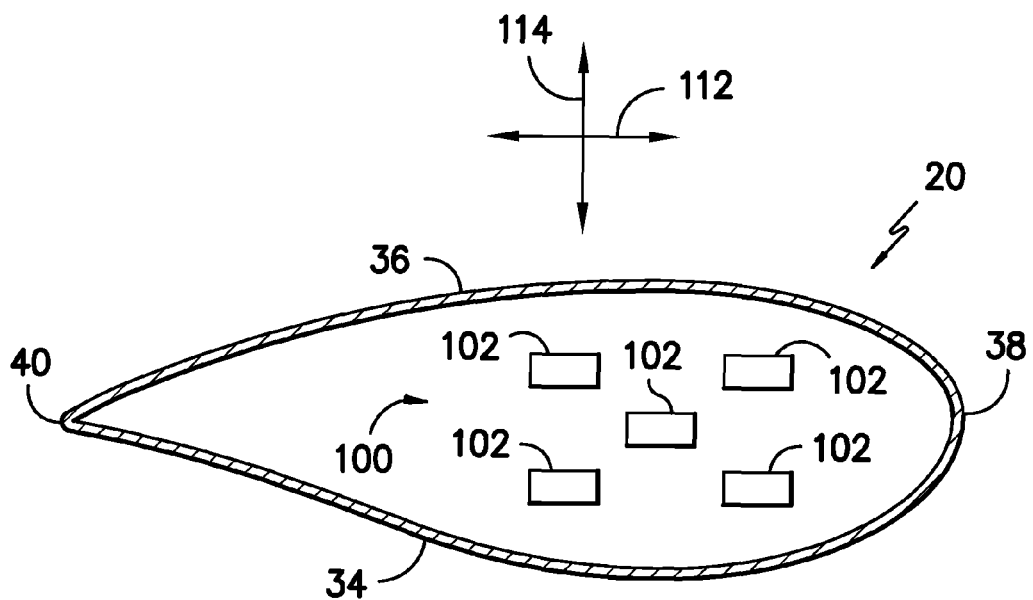
FIG. -4-
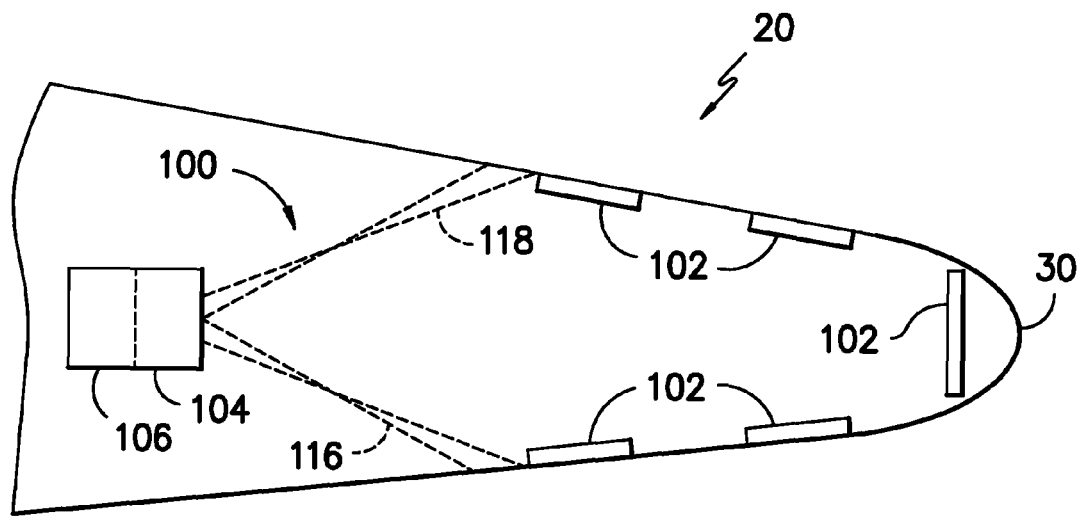
FIG. -5-

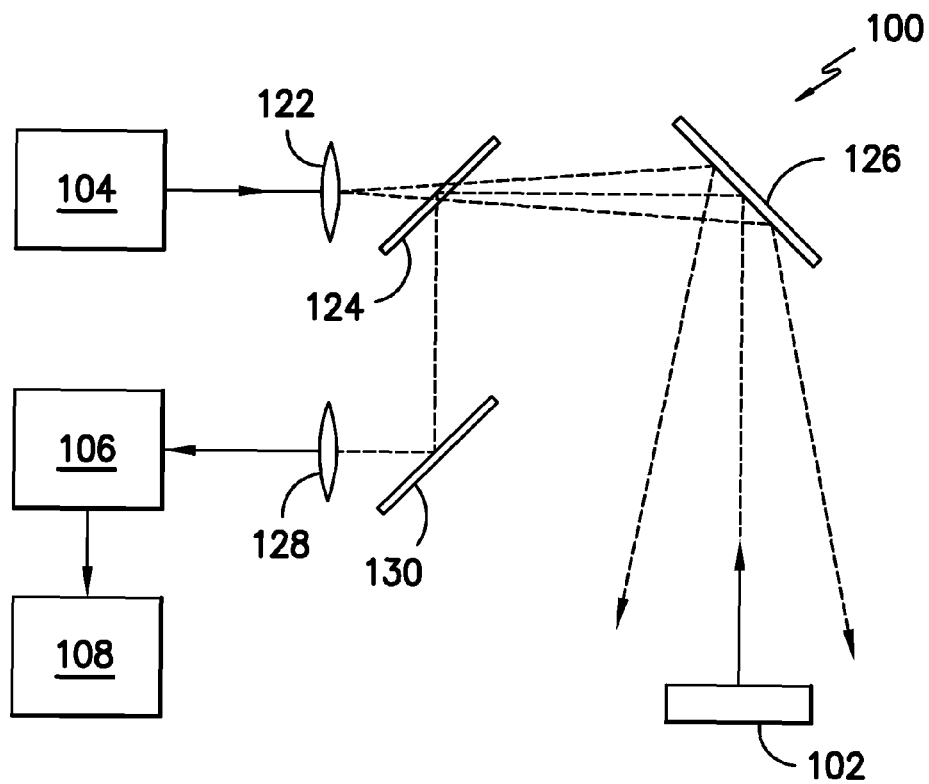
FIG. -6-
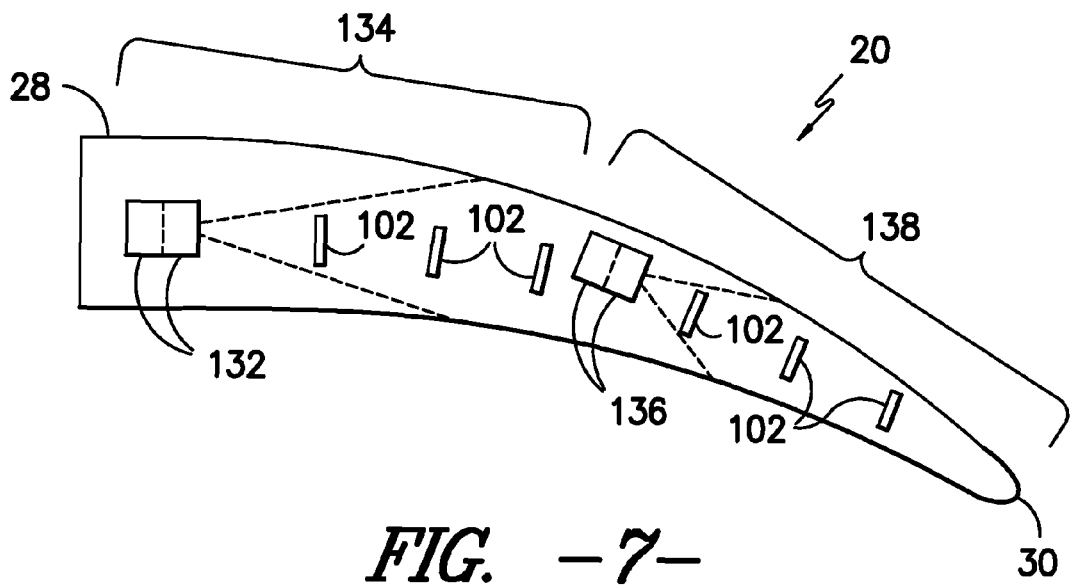
FIG. -7-

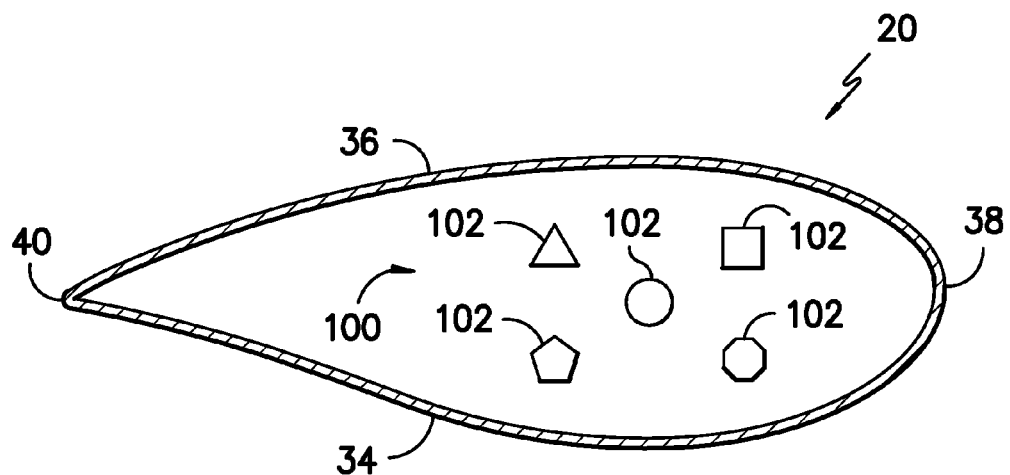
FIG. -8-
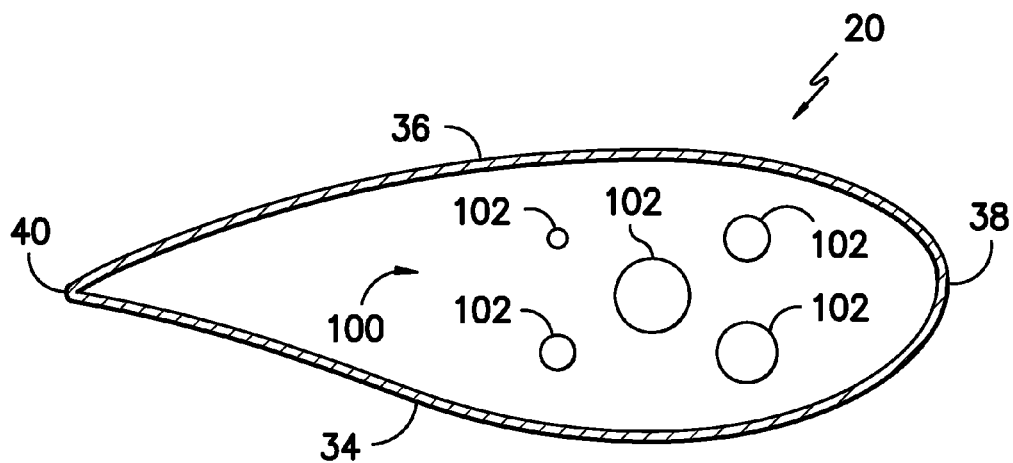
FIG. -9-

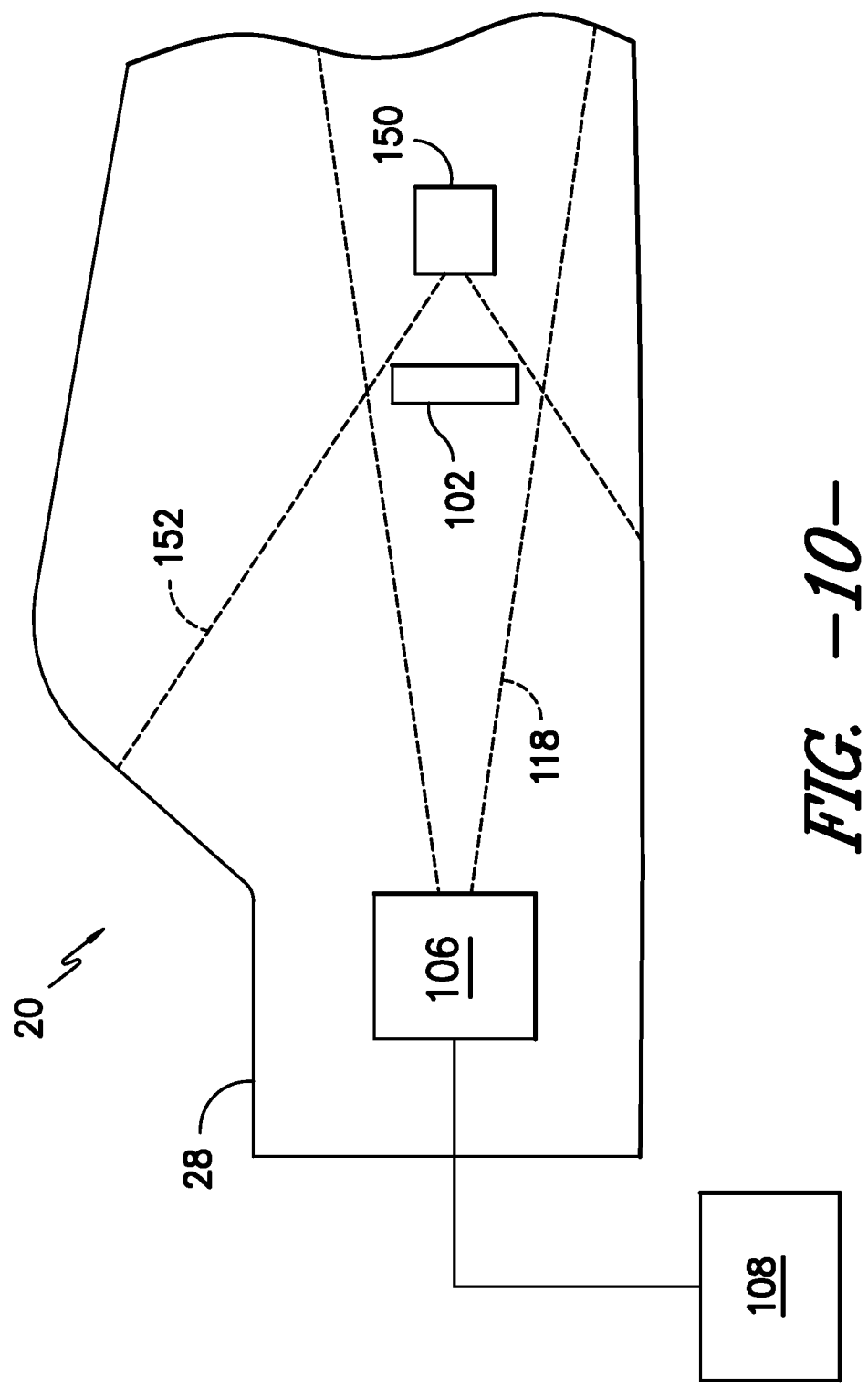
FIG. -10-

US 9,035,231 B2

SYSTEM AND METHOD FOR MONITORING LOAD-RELATED PARAMETERS OF A WIND TURBINE ROTOR BLADE

FIELD OF THE INVENTION

The present subject matter relates generally to wind turbines and, more particularly, to a system and method for monitoring load-related parameters of a wind turbine rotor blade, such as blade deflection and/or blade twisting

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the turbine blades. However, as is generally known, the deflection of a turbine blade is a function of blade length, along with wind speed, turbine operating states and blade stiffness. Thus, longer turbine blades may be subject to increased deflection forces, particularly when a wind turbine is operating in high-speed wind conditions. These increased deflection forces not only produce fatigue on the turbine blades and other wind turbine components but may also increase the risk of the turbine blades striking the tower. A tower strike can significantly damage a turbine blade and the tower and, in some instances, can even bring down the entire wind turbine. Accordingly, a tower strike may result in considerable downtime to repair or replace damaged components.

Known wind turbine systems determine turbine blade deflection by utilizing external sensors, which are typically mounted on the turbine blades or on the tower. These sensors are designed to sense turbine blade operating conditions (e.g. blade strain, blade acceleration or blade velocity) to enable blade deflection to be inferred or calculated. However, maintaining the sensors can be very costly and calibrating such sensors can be quite complex and time consuming. Moreover, since the sensors must be calibrated frequently, there is a concern with regard to the reliability of data transmitted from the sensors over an extended period of time.

To address these issues, at least one system has been developed that utilizes a camera and two reflective targets to measure blade deflection. Specifically, the reflector targets are mounted at two different locations within the rotor blade and the camera's flash is utilized to illuminate the reflector targets as the camera captures an image. By analyzing the spatial position of the two reflectors, the blade deflection of a small portion of the rotor blade may be estimated. However, this system is only equipped to identify two reflector targets within the rotor blade. As a result, there can only be two points along the length of the rotor blade at which blade deflection can be detected, which severely limits the amount of useful data that can be acquired regarding the motion and/or shape of the rotor blade along its entire length.

Accordingly, there is a need for a system that is capable of detecting a plurality of different targets positioned within a rotor blade in order to allow for detailed data regarding the motion and/or shape of the blade to be acquired.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring load-related parameters of a rotor blade of a wind turbine. The system may generally include a plurality of reflective targets positioned within the rotor blade. Each reflective target may include a unique visual identifier. In addition, the system may include a light source configured to illuminate the reflective targets and a sensor configured to detect light reflected from the reflective targets.

In another aspect, the present subject matter is directed to a method for monitoring load-related parameters of a rotor blade of a wind turbine. The method may generally include illuminating a plurality of reflective targets positioned within the rotor blade, detecting light reflected from the reflective targets and determining a load-related parameter of the rotor blade based on the detected light, wherein each of the reflective targets includes a unique visual identifier.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine;

FIG. 2 illustrates a perspective view of one embodiment of one of the rotor blades shown in FIG. 1;

FIG. 3 illustrates a side, internal view of the rotor blade shown in FIG. 2, particularly illustrating one embodiment of a system for monitoring load-related parameters of the rotor blade installed therein;

FIG. 4 illustrates a cross-sectional view of the rotor blade shown in FIG. 3 taken about line 4-4.

FIG. 5 illustrates a partial, internal view of a rotor blade having one embodiment of the disclosed system installed therein, particularly illustrating a plurality of reflective targets installed at and/or adjacent to the tip of the rotor blade;

FIG. 6 illustrates a simplified view of one embodiment of an optical arrangement that may be utilized with the disclosed system;

FIG. 7 illustrates an edge, internal view of the rotor blade shown in FIG. 2 in a deflected state, particularly illustrating the rotor blade including a first light source/sensor and a second light source/sensor installed therein;

FIG. 8 illustrates a cross-sectional view of the rotor blade shown in FIG. 2, particularly illustrating a plurality of reflective targets positioned within the rotor blade, with each target having a unique shape;

FIG. 9 illustrates a cross-sectional view of the rotor blade shown in FIG. 2, particularly illustrating a plurality of reflective targets positioned within the rotor blade, with each target having a unique size; and FIG. 10 illustrates partial, side view of the rotor blade shown in FIG. 2, particularly illustrating another embodiment of a system for monitoring load-related parameters of the rotor blade installed therein.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring load-related parameters of a wind turbine rotor blade, such as deflection and/or twisting of the blade. In several embodiments, the disclosed system may include a plurality of reflective targets positioned within the rotor blade at one or more locations. Each reflective target may include a unique visual identifier that differentiates the target from other targets within the rotor blade. In addition, the system may include a light source configured to illuminate the reflective targets and a sensor configured to detect light reflected from the targets. A controller may be communicatively coupled to the sensor and may be configured to analyze the detected light. For example, the controller may be configured to analyze the light in order to identify each of the reflective targets (via their unique visual identifier) and to determine their current position relative to the sensor. The controller may then compare the current position of each target to a baseline position stored within the controller's memory. By comparing such positions, the controller may detect changes in the positions of the targets, thereby providing an indication of the amount of deflection and/or twisting that is occurring.

Referring now to the drawings, FIG. 1 illustrates a side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

During operation of the wind turbine 10, wind strikes the rotor blades 20 from a direction 22, which causes the rotor 16 to rotate about an axis of rotation 24. As the rotor blades 20 are rotated and subjected to centrifugal forces, the blades 20 may also be subjected to various forces and bending moments. As such, the rotor blades 20 may deflect from a neutral, or non-deflected, position to a deflected position. For example, the non-deflected blade clearance, distance 26, represents the distance between the rotor blades 20 and the tower 12 when the blades 20 are in a non-deflected position. However, forces and bending moments acting on the rotor blades 20 may cause the blades 20 to deflect towards the tower 12, reducing the overall blade clearance. As aerodynamic loads increase, excessive forces and bending moments can cause one or more of the rotor blades 20 to strike the tower 12 resulting in significant damage and downtime.

In addition to bending moments, the rotor blades 20 may also be subject to torsional forces that result in twisting of the blades 20 along their length. Such twisting may produce fatigue on the rotor blades 20 and may also affect their aerodynamic performance.

Referring now to FIG. 2, a perspective view of one of the rotor blades 20 shown in FIG. 1 is illustrated. As shown, the rotor blade 20 generally includes a blade root 28 configured for mounting the rotor blade 20 to the hub 18 of the wind turbine 10 (FIG. 1) and a blade tip 30 disposed opposite the blade root 28. A body 32 of the rotor blade 20 may generally be configured to extend between the blade root 28 and the blade tip 30 and may serve as the outer casing/skin of the blade 20. In several embodiments, the body 32 may define a substantially aerodynamic profile, such as by defining a symmetrical or cambered airfoil-shaped cross-section. As such, the body 32 may include a pressure side 34 and a suction side 36 extending between a leading edge 38 and a trailing edge 40. Further, the rotor blade 20 may have a span 42 defining the total length between the blade root 28 and the blade tip 30 and a chord 44 defining the total length between the leading edge 38 and the trailing edge 40. As is generally understood, the chord 44 may vary in length with respect to the span 42 as the rotor blade 20 extends from the blade root 28 to the blade tip 30.

In several embodiments, the body 32 of the rotor blade 20 may be formed as a single, unitary component. Alternatively, the body 32 may be formed from a plurality of shell components. For example, the body 30 may be manufactured from a first shell half generally defining the pressure side 34 of the rotor blade 20 and a second shell half generally defining the suction side 35 of the rotor blade 20, with the shell halves being secured to one another at the leading and trailing edges 38, 40 of the blade 20. Additionally, the body 32 may generally be formed from any suitable material. For instance, in one embodiment, the body 32 may be formed entirely from a laminate composite material, such as a carbon fiber reinforced laminate composite or a glass fiber reinforced laminate composite. Alternatively, one or more portions of the body 32 may be configured as a layered construction and may include a core material, formed from a lightweight material such as wood (e.g., balsa), foam (e.g., extruded polystyrene foam) or a combination of such materials, disposed between layers of laminate composite material.

It should be appreciated that the rotor blade 20 may also include one or more longitudinally extending structural components configured to provide increased stiffness, buckling resistance and/or strength to the rotor blade 20. For example, in several embodiments, the rotor blade 20 may include one or more shear webs (not shown) extending between corresponding spar caps (not shown). However, in other embodiments, the rotor blade 20 may have any other suitable internal configuration.

Referring now to FIGS. 3 and 4, one embodiment of a system 100 for monitoring one or more load-related parameters of a rotor blade 20 (e.g., deflection and/or twisting of the rotor blade 20) is illustrated in accordance with aspects of the present subject matter. In particular, FIG. 3 illustrates a side view of the rotor blade 20 shown in FIG. 2 having one embodiment of the system 100 installed therein. Additionally, FIG. 4 illustrates a cross-sectional view of the rotor blade 20 shown in FIG. 3 taken about line 4-4. It should be appreciated that the disclosed system 100 may be configured to be installed into new rotor blades 20 or retrofitted into already existing rotor blades 20.

As shown, the system 100 may generally include a plurality of reflective targets 102 positioned within the rotor blade 20. As will be described below, each target 102 may include a unique visual identifier, thereby allowing the targets 102 to be differentiated from one another when viewed within the blade 20. In addition, the system 100 may include a light source 104 configured to illuminate the targets 102 and a sensor 106 configured to detect light reflected from the targets 102. For example, in several embodiments, the sensor 106 may be configured to capture one or more images of the illuminated targets 102. The images may then be transmitted to a system controller 108 for subsequent analysis. For example, the controller 108 may be configured to analyze the image(s) to identify each target 102 based on its unique visual identifier. The controller 108 may then compare the current position of each target 102 within the image(s) to a baseline position for such target 102 stored within the controller's memory. By determining the change in position for each target 102, the controller 108 may be configured to estimate the amount of blade deflection and/or blade twisting that is occurring due to the various loads acting on the rotor blade 20.

In general, each target 102 may comprise any suitable object having at least one surface configured to reflect light. In addition, each target 102 may be configured to be mounted or otherwise disposed at any suitable location within the rotor blade 20 at which information relating to the deflection and/or twisting of the blade 20 is desired to be obtained. For example, as shown in FIG. 3, in several embodiments, a plurality of targets 102 may be spaced apart at different radial stations along the length of the rotor blade 20. Specifically, in the illustrated embodiment, five targets 102 are spaced apart in the spanwise direction (indicated by arrow 110 in FIG. 3) along the length of the rotor blade 20.

However, it should be appreciated that, in alternative embodiments, the disclosed system 100 may generally include any number of reflective targets 102 positioned at any suitable location within the rotor blade 20. For example, as an alternative to spacing the reflective targets 102 apart along the length of the rotor blade 20, the targets 102 may be positioned at one or more localized regions within the rotor blade 20, which may be used to obtain increased data regarding the deflection and/or twisting of the blade 20 at such localized region(s). For example, as shown in FIG. 5, a plurality of reflective targets 102 may be positioned within the rotor blade 20 adjacent to the blade tip 30 to provide increasing data related to tip deflection and/or twisting.

In addition to spacing the reflective targets 102 apart in the spanwise direction 110, the targets 102 may also be spaced apart within the rotor blade 20 in the chordwise direction (indicated by arrow 112 in FIG. 4) and/or the widthwise direction (indicated by arrow 114 in FIG. 4). For example, as shown in FIG. 4, the targets 102 may be positioned at different chordwise and widthwise locations within the rotor blade 20 to ensure that each target 102 may be illuminated by the light source 104. For example, as shown in FIG. 3, the light source 104 may be configured to project a light beam 116 along at least a portion of the length of the rotor blade 20. Thus, by positioning the reflective targets 102 as shown in FIG. 4, each target 102 may be in the direct line of sight of the light source 104, thereby allowing the light source 104 to illuminate the targets 102. In addition, such positioning of the reflective targets 102 may also allow for each target 102 to be located within a field of view 118 (FIG. 3) of the sensor 106, thereby allowing the sensor to detect the light reflected by each target 102.

Moreover, the light source 104 and sensor 106 may generally be configured to be positioned within the rotor blade 20 at any suitable positions that allow such components to function as described herein. For example, as shown in FIG. 3, the light source 104 and sensor 106 may, in several embodiments, be disposed at or adjacent to the blade root 28. As such, the light source 104 may direct its light beam 116 outwardly in the direction of the blade tip 30 to illuminate the reflective targets 102. Similarly, the field of view 118 of the sensor 106 may be directed towards the blade tip 30 to allow the sensor 106 to detect light reflected from the targets 102. However, in other embodiments, the light source 104 and sensor 106 may be positioned at any other suitable location within the rotor blade 20 or at any suitable location outside the rotor blade 20 that permits the components to function as described herein (e.g., within the hub 18 at a location adjacent to the hub/blade interface).

It should be appreciated that the light source 104 may generally comprise any suitable light emitting device known in the art. For example, in several embodiments, the light source 104 may comprise a laser, such as a multi-wavelength laser (e.g., a Red-Green-Blue (RGB) laser), an electroluminescent light source (e.g. a light-emitting diode (LED)), an incandescent light source (e.g., an incandescent light bulb) and/or any other suitable light emitting device known in the art. Similarly, the sensor 106 may generally comprise any suitable sensing device known in the art that is configured to detect reflected light. For example, in several embodiments, the sensor 106 may comprise a camera, such as a digital camera, configured to capture images of the illuminated targets 102. In other embodiments, the sensor 106 may comprise any other suitable imaging device, such as an image sensor, a light sensor, a color sensor and/or any other suitable light sensing device. For instance, in a specific embodiment of the present subject matter, the sensor 106 may include a charge-coupled device (CCD) array and/or any other suitable color photo detector array.

It should also be appreciated that the light source 104 and sensor 106 may be configured as separate components or may be integrated together into a single component. In addition, the light source 104 and sensor 106 may be configured to be utilized with any suitable optical arrangement for projecting light onto the reflective targets 102 and/or for receiving light reflected by the targets 102. For example, FIG. 6 illustrates one embodiment of an optical arrangement that may be used to allow the light derived from the light source 104 and the light detected by the sensor 106 to be transmitted and received along a common light path. As shown, the light transmitted from the light source 104 may pass through a lens 122 and a beam splitter 124 (e.g., a half-silvered mirror) before being reflected via a mirror 126 in the direction of the reflective targets 102. Similarly, the light from the illuminated targets 102 may be reflected back towards the mirror 126 and redirected towards the beam splitter 124. The beam splitter 124 may then be configured to reflect the light from the illuminated targets 102 towards a second lens 128 (e.g., via a second mirror 130) in order to focus the light into the sensor 106. However, it should be appreciated that, in alternative embodiments, the system 100 may include any other suitable optical arrangement that allows the light source 104 and the sensor 106 to function as described herein.

Additionally, it should be appreciated that, although the system 100 is shown in FIG. 3 as including a single light source 104 and a single sensor 106, the system 100 may generally include any number of light sources 104 and/or sensors 106. This may, in several embodiments, be necessary due to configuration of the rotor blade 20 (e.g., due to internal components such as shear webs) and/or due to any deflection/twisting that is occurring during operation of the wind turbine 10. For example, as shown in the edge view of FIG. 7, the rotor blade 20 may deflect during operation in a manner that prevents each reflective target 102 from being illuminated and/or detected by a single light source 104 and/or sensor 106. In such an embodiment, an additional light source(s) 104 and/or sensor(s) 106 may be used to facilitate illuminating and/or detecting each reflective target 102 positioned within the rotor blade 20. For instance, as shown in FIG. 7, a first light source/sensor 132 may be positioned at and/or adjacent to the blade root 28 in order to illuminate/detect reflective targets 102 positioned within a first, inboard portion 134 of the rotor blade 20 while a second light source/sensor 136 may be positioned at a more outboard location in order to illuminate/detect reflective targets 102 positioned within a second, outboard portion 138 of the rotor blade 20. Alternatively, one or more mirrors (not shown) may be positioned at one or more suitable locations along the length of the rotor blade 20 in order to extend the range of the light source 104 and/or the sensor 106.

As indicated above, the sensor 106 may be configured to detect the light reflected by the illuminated targets 102 and transmit data associated with the detected light to the controller 108 for subsequent analysis. For example, in several embodiments, the sensor 106 may be configured to capture and transmit images of the illuminated targets 102 to the controller 108. The controller 108 may then be configured to analyze the images (e.g., by using suitable image processing algorithms) in order to detect changes in the spatial position of each target 102, which may then be correlated to the amount of blade deflection and/or twisting that is occurring during operation of the wind turbine 10.

For instance, in several embodiments, a baseline position for each target 102 may be stored in a database within the controller's memory. This baseline position may, in one embodiment, be derived from one or more initial images captured by the sensor 106 while the rotor blade 20 is a non-deflected and non-twisted state. For example, the baseline position may correspond to a known resolution (e.g., a known pixel count) of each target 102 within the initial image(s) based on the target's actual size and/or known image coordinates (e.g., a known x/y raster) of each target 102 within the initial image(s) based on the field of the view of the sensor 106. In such embodiments, for each new image captured by the sensor 106 during operation of the wind turbine 10, the controller 108 may compare the baseline position to the current position shown in the new image(s). For instance, the controller 108 may be configured to compare the known resolution and/or the known image coordinates for a particular target 102 to the resolution and/or image coordinates of such target 102 in the newly acquired image(s). The controller 108 may then correlate the changes in position of the targets 102 to the amount of blade deflection and/or twisting that is occurring. In addition, the controller 108 may also be configured to determine whether a change has occurred in the relative positioning between two or more of the reflective targets 102, which may also provide an indication of the amount of blade deflection and/or twisting that is occurring.

It should be readily appreciated by those of ordinary skill in the art that a mathematical relationship may be developed to correlate the change in position of one or more of the reflective targets 102 to the amount of deflection and/or twisting of the rotor blade 20. Such a mathematical relationship may, for example, be developed through experimentation and/or blade modeling. For instance, in one embodiment, the 3-D coordinates of the location of each reflective target 102 may be monitored using suitable sensors (e.g., position sensors) while the rotor blade 30 is being deflected and/or twisted by known amounts. The actual change in the 3-D coordinates detected by the sensor(s) may then be correlated to the corresponding change in position detected using the sensor 106 and controller 108 of the disclosed system 100.

Moreover, as indicated above, to allow for the controller 108 to distinguish between the reflective targets 102, each target 102 may include a unique visual identifier that is capable of being recognized by the controller 108. Thus, in addition to analyzing the images received by the sensor 106 to determine the current position of each reflective target 102, the controller 108 may also be configured to identify each target 102 based on its unique visual identifier. The controller 108 may then reference its database to determine the baseline position associated with each identified target 102, thereby allowing the controller 108 to determine the change in position of each target 102.

In general, the unique visual identifier associated with each target 102 may correspond to any suitable identifying feature that may be visually recognized by the controller 108 when analyzing the images captured by the sensor 106. For example, in several embodiments, the unique visual identifier may correspond to a unique color-encoded surface. Specifically, each target 102 may include a color-encoded surface that is configured to reflect light only within a narrow frequency band corresponding to a particular color, thereby permitting the controller 108 to identify each target 102 by recognizing the color reflected from its surface.

For example, during operation of the system 100, the light source 104 may be configured to emit a multi-wavelength beam of light including frequency bands corresponding to the plurality of colors (e.g., red, blue, green, purple, orange, yellow etc.) associated with the color-encoded surfaces. Thus, as the light strikes the color-encoded surface of each target 102, the surface may only reflect the light at a frequency corresponding to the specific color assigned to such target 102. Images of the targets 102 and their reflected colors may then be captured by the sensor 106 and transmitted to the controller 108 for identification. For instance, as indicated above, the color associated with each reflective target 102 may be stored within the controller's memory together with its baseline position data. The controller 108 may then compare the baseline position for each reflective target 102 to its current position in order to determine whether any deflection and/or twisting of the rotor blade 20 is occurring.

It should be appreciated that the surface of the reflective targets 102 may be color-encoded using any suitable means and/or method known in the art. For instance, in several embodiments, a film coating may be applied to the surface of each target 102 to form a dichroic or interference filter that limits the frequency at which light is reflected from such target 102. Thus, by carefully tailoring the coating applied to each target 102, the targets 102 may be configured such that each target 102 reflects a different color within the color spectrum. The application of such thin-film filters are well known in the art and, thus, need not be described in detail herein. Alternatively, the reflective targets 102 may be color-encoded using any other suitable means, such as by covering the surface of each target 102 with a differently colored tape or material.

It should also be appreciated that, in alternative embodiments, the unique visual identifiers may correspond to any other suitable visual features that may be used to identify each reflective target 102. For example, in one embodiment, the unique visual identifier may correspond to a unique shape. Specifically, as shown in FIG. 8, each target 102 may include a reflective surface defining a unique shape, such as a circle, triangle, square, pentagon, octagon and/or any other suitable shape. As such, by capturing images of the illuminated targets 102, each target 102 may be identified by the controller 108 based on its specific shape. In another embodiment, the unique visual identifier may correspond to a unique size. For example, as shown in FIG. 9, each target 102 may include a reflective surface defining a unique area, such as by configuring each target 102 to define a different diameter or width. Thus, by capturing images of the illuminated targets 102, each target 102 may be identified by the controller 108 based on its specific size.

In further embodiments, the unique visual identifiers may comprise any other suitable identifying features, including combinations of two or more identifying features, such as by configuring each target 102 to include a combination of at least two of a unique color-encoded surface, a unique shape or a unique size. For example, it may be desirable to utilize different sized targets 102 regardless of whether any other visual identifiers are being utilized in order to compensate for the targets 102 located furthest away from the sensor 108. Specifically, in one embodiment, the size of each target 102 may be increased as the targets 102 are positioned within the rotor blade 20 further away from the sensor 108, thereby compensating for any losses in resolution.

Referring now to FIG. 10, another embodiment of the disclosed system 100 is illustrated in accordance with aspects of the present subject matter. As shown, instead of including a light source 104 adjacent to the sensor 106, each target 102 (one of which is shown) may include a backlight 150 configured to illuminate the target 102. Specifically, the backlight may be configured to direct a beam of light 152 against the backside of the target 102, thereby forming a silhouette of the target 102 within the field of view 118 of the sensor 106. This silhouette may then be detected by the sensor 106 and subsequently used by the controller to identify the target 102 and determine its current position.

It should be appreciated that, in alternative embodiments, the disclosed system 100 may include both a backlight 150 for each target 102 as well as a front light (e.g., light source 104) configured to illuminate all of the targets 102. In such an embodiment, the amount of light directed towards each target 102 by both lights may be carefully tailored to achieve an optimal contrast between shading and reflected light, thereby increasing the ability of the controller 108 to identify and determine the position of each target 102.

Additionally, it should be appreciated that the controller 108 described herein may generally comprise a computer and/or any other suitable processing unit. Thus, in several embodiments, the controller 108 may include one or more processor(s) and associated memory device(s) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 108 to perform various functions including, but not limited to, and identifying the unique visual identifier for each reflective target 102, determining the current position of each reflective target 102, comparing the current position of each target 102 to its baseline position and/or various other suitable computer-implemented functions.

It should also be appreciated that, in addition to being configured to determine the amount of blade deflection and/or twisting of the rotor blade 22, the controller 108 may also be configured to issue a control command to components of the wind turbine 10 or otherwise perform a corrective action in order to reduce the amount of deflection and/or twisting. For example, in one embodiment, the controller 108 may be configured to perform a corrective action in response to a determined blade deflection of one or more of the rotor blades 20 that exceeds a predetermined blade deflection threshold. Alternatively, the controller 108 may be configured to perform a corrective action in response to blade twisting of one or more of the rotor blades 22 that exceeds a predetermined twist threshold.

The particular corrective action performed by the controller 108 may take many forms. For example, in one embodiment, the corrective action may include altering the pitch angle of one or more rotor blades 20 for a partial or full revolution of the rotor 16, which may reduce blade deflection by increasing out-of-plane stiffness. As is generally understood, this may accomplished by controlling a pitch drive of the wind turbine 10.

In another embodiment, the corrective action may include yawing the nacelle 14 to change the angle of the nacelle 14 relative to the direction of the wind. A yaw drive mechanism (not shown) is typically used to change the angle of the nacelle 14 so that the rotor blades 20 are properly angled with respect to the prevailing wind. For example, pointing the leading edge of a rotor blade 20 upwind can reduce loading on the blade 20 as it passes the tower 12.

Alternatively, the corrective action may comprise modifying the blade loading on the wind turbine 10 by increasing the torque demand on the electrical generator (not illustrated) positioned within the nacelle 14. This reduces the rotational speed of the rotor blades 20, thereby potentially reducing the aerodynamic loads acting upon the surfaces of the blades 20.

It should be readily appreciated, however, that the controller 108 need not perform one of the corrective actions described above and may generally perform any corrective action designed to reduce blade deflection and/or twisting. Additionally, the controller 108 may be configured to perform multiple corrective actions simultaneously, which may include one or more of the corrective actions described above.

It should also be appreciated that, in one embodiment, each light source described herein (e.g., light source 104 and backlight 150) may be configured to continuously emit a beam of light within the rotor blade 20. Alternatively, the light sources may comprise strobe lights and/or may otherwise be configured to periodically emit a beam of light within the rotor blade 20. For example, in one embodiment, the light sources may be synchronized with the sensor 106 such that the targets 102 are illuminated immediately prior to the sensor 106 being activated (e.g., by timing to the light sources to operate similar to the flash on a camera).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring load-related parameters of a rotor blade of a wind turbine, the system comprising:
    a plurality of reflective targets positioned within the rotor blade, each of the plurality of reflective targets including a unique visual identifier;
    a light source configured to illuminate the plurality of reflective targets;
    a sensor configured to detect light reflected from the plurality of reflective targets; and
    a controller communicatively coupled to the sensor the controller being configured to identify the unique visual identifier of each of the plurality of reflective targets based on the light detected by the sensor and determine a current position of each of the plurality of reflective targets based on the light detected by the sensor,
    wherein the controller is further configured to compare the current position to a baseline position or each of the plurality of reflective targets in order to determine a load-related parameter of the wind turbine.

2. The system of claim 1, wherein the load-related parameter comprises at least one of deflection of the rotor blade or twisting of the rotor blade.

3. The system of claim 1, wherein the plurality of reflective targets are spaced apart along a length of the rotor blade.

4. The system of claim 1, wherein the plurality of reflective targets are positioned within the rotor blade at a location adjacent to a tip of the rotor blade.

5. The system of claim 1, wherein the unique visual identifier comprises a unique color-encoded surface, each of the color-encoded surfaces being configured to reflect light at a different frequency.

6. The system of claim 1, wherein the unique visual identifier comprises a unique shape.

7. The system of claim 1, wherein the unique visual identifier comprises a unique size.

8. The system of claim 1, wherein the e light source is configured to produce a multi wavelength beam of light.

9. The system of claim 1, wherein the sensor comprises a camera configured to capture images of the plurality of reflective targets.

10. The system of claim 1, wherein the light source and the sensor are both mounted within the rotor blade.

11. The system of claim 1, further comprising a plurality of light sources and a plurality of sensors, each of the plurality of light sources being configured to illuminate at least one of the plurality of reflective targets, each of the plurality of sensors being configured to detect light reflected by at least one of the plurality of reflective targets.

12. A system for monitoring load-related parameters of a rotor blade of a wind turbine, the system comprising:
    a plurality of targets positioned within the rotor blade;
    a plurality of backlights associated with the plurality of targets, each of the plurality of backlights being configured to illuminate one of the plurality of targets such that a silhouette is formed around each target; and
    a sensor configured to detect the silhouette is formed around each target.

13. A method for monitoring load-related parameters of a rotor blade of a wind turbine, the method comprising:
    illuminating a plurality of reflective targets positioned within the rotor blade, each of the plurality of reflective targets including a unique visual identifier;
    detecting light reflected from the plurality of reflective targets;
    comparing a current position of each of the plurality of reflective targets to a baseline position of each of the plurality reflective targets; and
    determining a load-related parameter of the rotor blade based on the detected light.

14. The method of claim 13, wherein the unique visual identifier comprises at least one of a unique color-encoded surface, a unique shape or a unique size.

15. The method of claim 13, further comprising identifying the unique visual identifier for each of the plurality of reflective targets based on the detected light.

16. The method of claim 13, wherein determining a load-related parameter of the rotor blade based on the detected light comprises correlating a change in position of at least one of the plurality of reflective targets to the load-related parameter.

17. The method of claim 13, wherein the load-related parameter comprises at least one of deflection of the rotor blade or twisting of the rotor blade.

* * * * *